(12) United States Patent
Malaender et al.

(10) Patent No.: US 7,421,039 B2
(45) Date of Patent: Sep. 2, 2008

(54) METHOD AND SYSTEM EMPLOYING ANTENNA ARRAYS

(75) Inventors: Laurence Eugene Malaender, New York, NY (US); Reinaldo A. Valenzuela, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1036 days.

(21) Appl. No.: 10/160,126

(22) Filed: Jun. 4, 2002

(65) Prior Publication Data
US 2003/0223391 A1 Dec. 4, 2003

(51) Int. Cl.
*H04L 27/12* (2006.01)
*H04L 7/02* (2006.01)

(52) U.S. Cl. .................. 375/304; 375/267; 370/334
(58) Field of Classification Search ........... 375/304, 375/267, 367, 299; 370/334, 252
See application file for complete search history.

(56) References Cited

U.S. PATENT DOCUMENTS

| | | | | |
|---|---|---|---|---|
| 5,771,021 A | * | 6/1998 | Veghte et al. | 343/700 MS |
| 5,999,800 A | * | 12/1999 | Choi et al. | 455/73 |
| 6,473,467 B1 | * | 10/2002 | Wallace et al. | 375/267 |
| 2002/0132600 A1 | * | 9/2002 | Rudrapatna | 455/277.1 |
| 2003/0013468 A1 | * | 1/2003 | Khatri | 455/501 |
| 2003/0128658 A1 | * | 7/2003 | Walton et al. | 370/208 |
| 2003/0161282 A1 | * | 8/2003 | Medvedev et al. | 370/329 |
| 2003/0185310 A1 | * | 10/2003 | Ketchum et al. | 375/259 |
| 2004/0018818 A1 | * | 1/2004 | Hottinen et al. | 455/78 |
| 2004/0095907 A1 | * | 5/2004 | Agee et al. | 370/334 |
| 2005/0286650 A1 | * | 12/2005 | Han et al. | 375/267 |

* cited by examiner

Primary Examiner—Temesghen Ghebretinsae (57) ABSTRACT

In the method and system, a transmitter demultiplexes an input data stream into M substreams, where each of the M substreams have a data rate lower than a data rate of the input data stream. The substreams are transmitted as signals from a transmit array of M antennas to be received by a receiver array at a receiver in the system, based on a set of transmission parameters. The transmitter adjusts at least one of the transmission parameters based on a condition experienced by the receiver so as to increase data throughput in the system. The adjustable parameters include the number of antennas to employ, the on/off patterns for the antennas, and eigenmode values for the antennas used in order to determine transmit power. Accordingly, system data throughput may be improved while maintaining transmit power and system bandwidth constant.

23 Claims, 4 Drawing Sheets

METHOD AND SYSTEM EMPLOYING ANTENNA ARRAYS

BACKGROUND OF THE INVENTION

1. Field of the Invention

The present invention generally relates to wireless communication systems, and more particularly to a wireless communication system using transmit and receive antenna arrays to increase information transfer rate in the system.

2. Description of Related Art

An ordinary point-to point wireless link typically includes a single antenna at the transmitter and a single antenna at the receiver. A typical point-to-point wireless link may include a base station and a mobile station with transmissions from the base to the mobile occurring on what is characterized as a downlink and transmissions from the mobile to the base occurring on an uplink. One or both antennas may be highly directional in order to maximize received radio power. The maximum possible rate at which data signaling over such a radio or "air interface" link can occur is well understood, and depends on factors such as transmission frequency, the available bandwidth and the signal-to noise ratio as experienced at the receiver. Thus an idealized link in a wireless radio communication system might include a transmitter and a receiver each with highly directional antennas oriented toward each other and transmitting at a high frequency for maximum information transfer. An idealized link however is not what is typically found in most radio communication environments.

Most modern mobile radio communication is based on the cellular concept, in which a mobile terminal communicates with the nearest base station enabling transmission to occur both on the uplink and the downlink with the lowest possible power. Transmitting with low power is desirable for reasons including conservation of battery in mobile handsets and reduction in interference between channels. In addition, transmit power is often set in various specifications which govern the specific details of cellular radio communications.

At present there are primarily two broad system concepts employed in the majority of cellular radio communications systems: time division multiple access (TDMA) and code division multiple access (CDMA). In TDMA-based systems such as the standards based Global System for Mobile communications (GSM) and the North American TDMA (IS-136), different groups of frequency bands are typically allocated to different cells, and time slots are assigned to distinguish users within a cell. Since only a limited number of frequencies are available, the same communications frequencies are "re-used" in cells located at a predetermined geographical distance from any other cell where the frequency or frequencies are also being used. The geographical distance is made large enough to avoid frequency interference between cells. In stark contrast, CDMA systems use the same frequency band all cells. To avoid interference, spread spectrum modulation is used on transmitted sequences such that transmissions from different users are uniquely "coded".

In existing systems however, whether TDMA or CDMA, throughput is limited since typically, a single fixed resource is divided according to the number of users. In the case of TDMA, throughput may be limited by division of the time domain according to the number of users and the number of frequencies, and with CDMA throughput may be limited by the number of unique codes that may be assigned according to a number of users. Additionally there is a need for increasing the throughput on limited resources beyond that provided by conventional multiple access methods.

SUMMARY OF THE INVENTION

In order to increase data throughput in a communication system, a transmitter adjusts at least one transmission parameter, based on a condition detected at a receiver, in order to determine transmit power. The adjustable transmission parameter may be embodied as one or more of a number of antennas to employ, on/off patterns for the antennas used by the transmitter, and eigenmode values for the antennas used.

BRIEF DESCRIPTION OF THE DRAWINGS

The present invention will become more fully understood from the detailed description given hereinbelow and the accompanying drawings, wherein like elements are represented by like reference numerals, which are given by way of illustration only and thus are not limitative of the present invention and wherein.

DETAILED DESCRIPTION

As will be more fully described below, the present invention is provided for a communication system such as a multiple-input, multiple output (MIMO) wireless communication system. The present invention will also be described in terms of its use and adaptation to re-use with CDMA/TDMA systems and to re-use with TDMA/FDMA systems. Additionally, several illustrated adaptation procedures are described in accordance with the method of the invention which are effected using the above-described systems. Further, in light of the above-described communication systems, the present invention provides a method and system in which certain transmission parameters, such as the number of antennas to employ, the on/off patterns for the antennas, and the eigenmodes for the antennas used in order to determine transmit power, are adjusted in order to increase data throughput in the communication system.

As will be seen below, the present invention provides a method and communication system such as a MIMO system having a point-to-point wireless link employing multiple antennas at a transmitter and receiver. The MIMO system does not specify a method for multiple access (MA) used by a plurality of users that are sharing a channel. Accordingly, there are described different alternative system configurations that handle multiple users based on frequency division, and/or time/code division communication systems Additionally, MIMO transmission parameters may be adjusted for particular radio conditions experienced at a given location, in an effort to optimize system throughput.

In accordance with various exemplary embodiments of the present invention, a MIMO system permits significantly higher rates to be achieved in the same bandwidth and with the same transmit power and radio noise environment, by using multiple antennas at both the transmitter and the receiver.

Figure 1A:
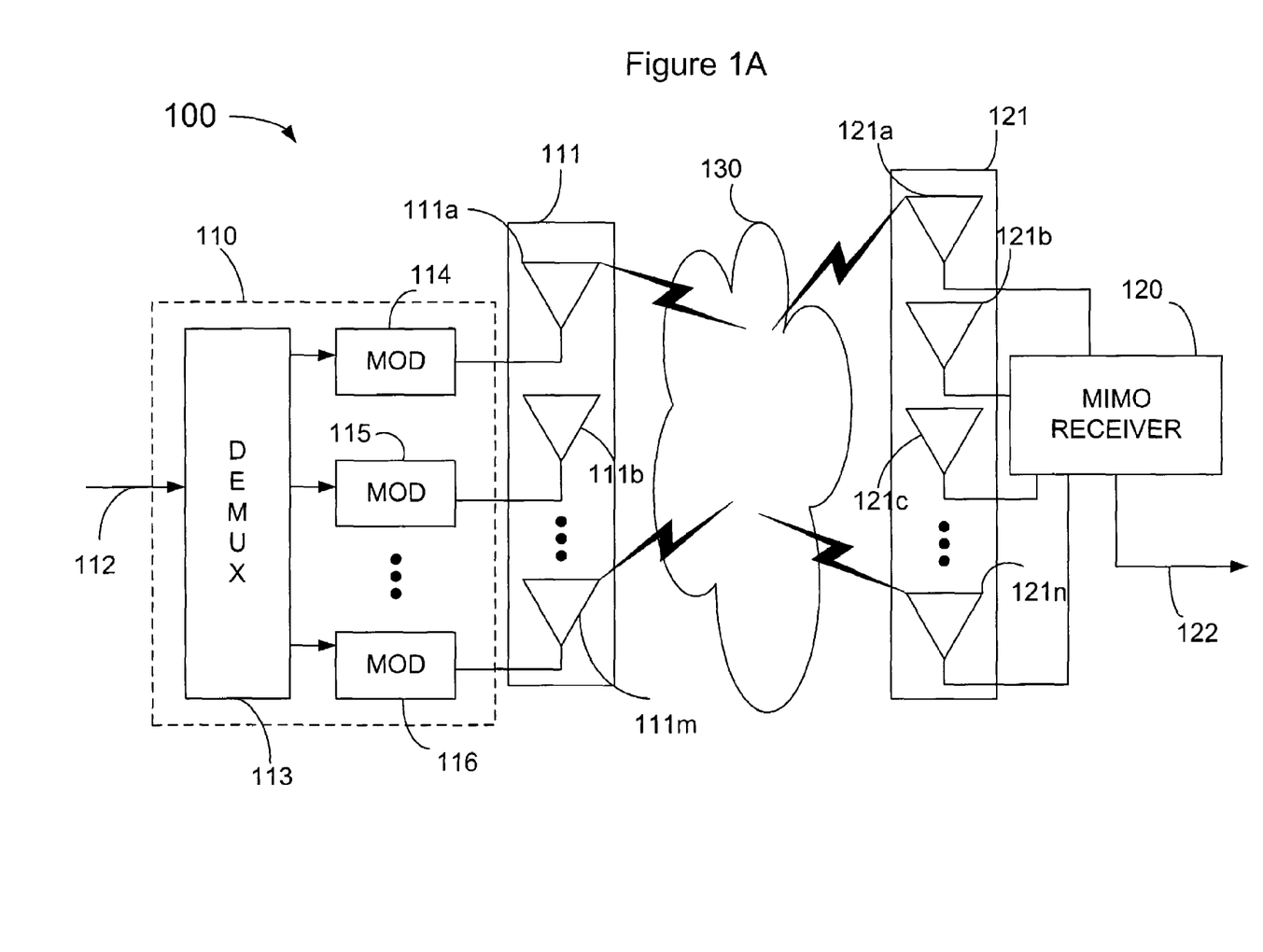
FIG. 1A is a block diagram illustrating an exemplary transmitter and receiver in accordance with exemplary embodiments of the present invention.

With reference to FIG. 1A, system 100, which is preferably a MIMO system, includes a transmit array 111 of M antennas associated with an exemplary transmitter 110, and an array 121 of N antennas associated with an exemplary receiver 120. The maximum communication rate associated with system 100 increases linearly with the number of antennas. Transmitter 110 de-multiplexes an original high-speed input stream 112 using de-multiplexer 113 into M different lower-rate data streams or substreams. The M different substreams are sent to a respective transmit antenna 111a-111m via a corresponding modulator 114-116, etc. Each substream is transmitted from a different one of the transmit antennas 111a-111m of transmit array 111 via an air interface 130 for example, to be received by a receiver 120. The M signals associated with the substreams generated by de-multiplexer 113 operate in a co-channel mode. In other words, an ordinary receiver would see a super-positional sum of the M signals, but would have no means of separating the M signals in order to decode information associated with each individual substream.

Receiver 120 may be a MIMO receiver, for example, and may utilize a receive array 121 that includes N receive antennas, e.g., receive antennas 121a-121n, where M is greater than or equal to N. MIMO receiver 120 operates in a suitable "rich-scattering" radio environment. MIMO Receiver 120 may further utilize signal processing algorithms, circuitry or applications to separate the M signals, as will be described in greater detail hereinafter.

Accordingly, M signals may be sent over a radio channel that was previously capable of carrying only one signal. A "rich-scattering" channel is a channel in which many radio-reflective objects are positioned randomly in a transmission environment such as, for example, within a typical office building, or within an urban area, provided there are not too many signal blocking objects. The rich scattering channel may further be characterized by factors such as delay spread and angle spread, and may be subject to independent signal fading at various ones of the receive antennas 121a-121n.

Figure 1B:
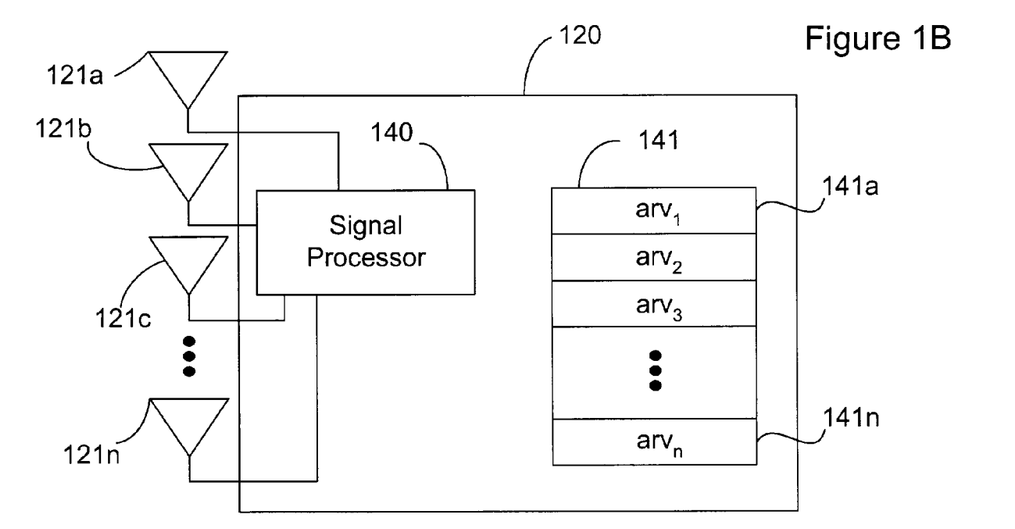
FIG. 1B is a block diagram further illustrating an exemplary receiver in accordance with exemplary embodiments of the present invention.
Figure 1C:
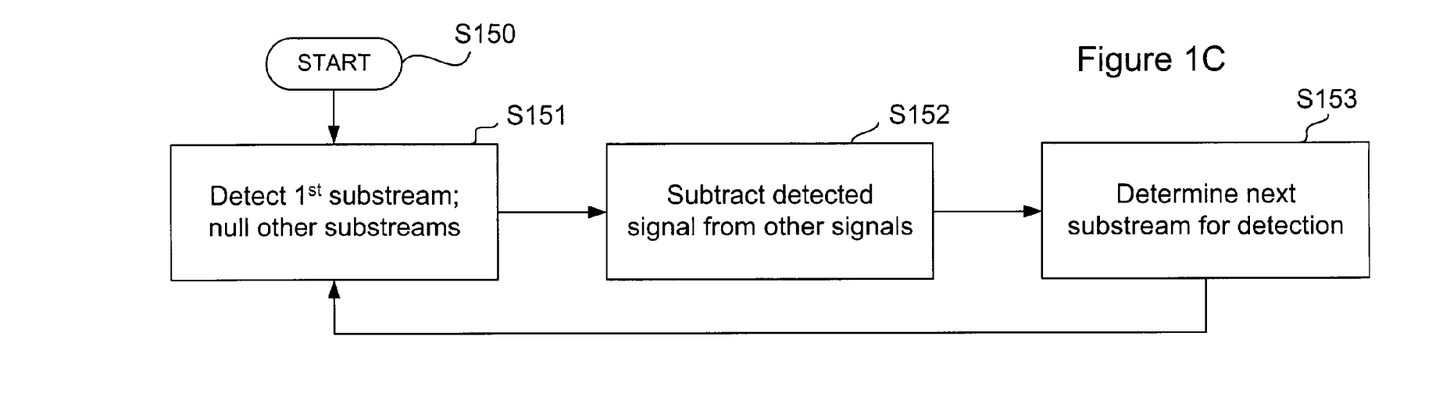
FIG. 1C is a flowchart illustrating exemplary receiver signal processing in accordance with exemplary embodiments of the present invention.

Typical signal processing steps associated with an exemplary MIMO receiver can be described with reference to FIGS. 1B and 1C. In an exemplary flat fading scenario, array response vectors (arv) 141a-141n, which may be embodied as sets of N complex numbers, for example, are generated and/or stored at MIMO receiver 120 in a memory 141 that is coupled to a signal processor 140. Array response vectors are generated through standard channel estimation techniques, such as by using a pilot channel correlator, for example. Array response vectors 141a-141n comprise columns of a channel coefficient matrix, H, discussed in further detail below. The signal processor may be configurable as any of an algorithm, application or circuit within MIMO receiver 120. Each array response vector 141n may be associated with a corresponding receive antenna 121n.

Array response vectors 141a-141n may change in time, and are different for each transmit antenna 121a-121n. Also, the received signals from antennas 121a-121n may be coupled to signal processor 140 for further processing. Assuming that array response vectors 141a-141n do change slowly in time, and are known by the MIMO receiver 120, exemplary signal processing beginning at step S150 as illustrated in the flowchart of FIG. 1C includes detecting one substream while nulling all the remaining ones in a nulling step S151, subtracting the detected signal from all the array elements in a canceling step S152, and determining which substream should be detected next in an ordering step S153. Steps S151-S153 may be accomplished using zero-forcing or de-correlating, and minimum mean-square error (MMSE) detection for example, which are well-known in the communications literature. The result of the signal processing described in FIG. 1C is a near-perfect separation of the M substreams.

Again referencing FIG. 1A, MIMO receiver 120 may be tuned for a particular base-to-mobile channel. At transmitter 110, transmit array 111 may be adjusted for a particular number of substreams associated with, for example, a particular active set of antennas where each substream is mapped to one of transmit antennas 111a-111m in transmit array 111, or alternatively, substreams may be mapped to weighted combinations of several transmit antennas 111a-111m corresponding to different eigenmodes. Eigenmodes correspond to equivalent, parallel channels that are derived from a channel matrix, as is known in the art and as is discussed further below.

In addition, a transmitted constellation size, k, equal to the number of bits per symbol, may be adjusted to get the maximum throughput for a given link depending on, for example, the available signal-to-noise ration (SNR), and the scattering environment. Receive array 121 may also be adjusted to change the dimension N, i.e., the number of antennas 121a-121n. In accordance with various exemplary embodiments of the present invention, all N receive antennas in receive array 121 are used. Additionally, the configuration of transmitter array 111 is set to exploit the scattering radio environment, and the constellation size, e.g., bits per symbol, and to set the desired error rate depending on the SNR present within the scattering environment. Hence, rich scattering increases throughput by allowing more transmit streams to be used simultaneously, and the SNR increases throughout by allowing more bits per symbol to be used.

As described, system 100 basically includes a point-to-point radio link, and incorporates a known mechanism for sharing a channel between multiple users. Factors such as controlling in-cell and out-of-cell interference should be addressed. Moreover, system parameters should be adjusted to maximize the efficiency of each link.

Re-Use in CDMA/TDMA System

In a CDMA/TDMA system, users are assigned a unique time slot, and the users operate with variable spreading gain. A base station typically communicates with only one user at a time; thus there is no in-cell interference. In accordance with one embodiment of the present invention, transmit power is maintained at a constant power level—there is no power control as, may be found in an IS-95 standard communication system, for example. The mobile terminal measures the radio characteristics to determine, for example, the transmitter configuration Ma, the modulation order k, and the spreading gain G, subject to a desired error rate.

Accordingly, the transmission rate achieved may preferably be different for each user based on the strength of the received signal and the level of noise, as well as based on the level of signal correlation among the user's antennas in order to achieve the desired transmission rate. Thus, system parameters may be adjusted. Alternatively, power control may be used if the user requests a particular data rate, or if there is a sparse set of available rates and the remaining power is insufficient to achieve a higher data rate.

Figure 2A:
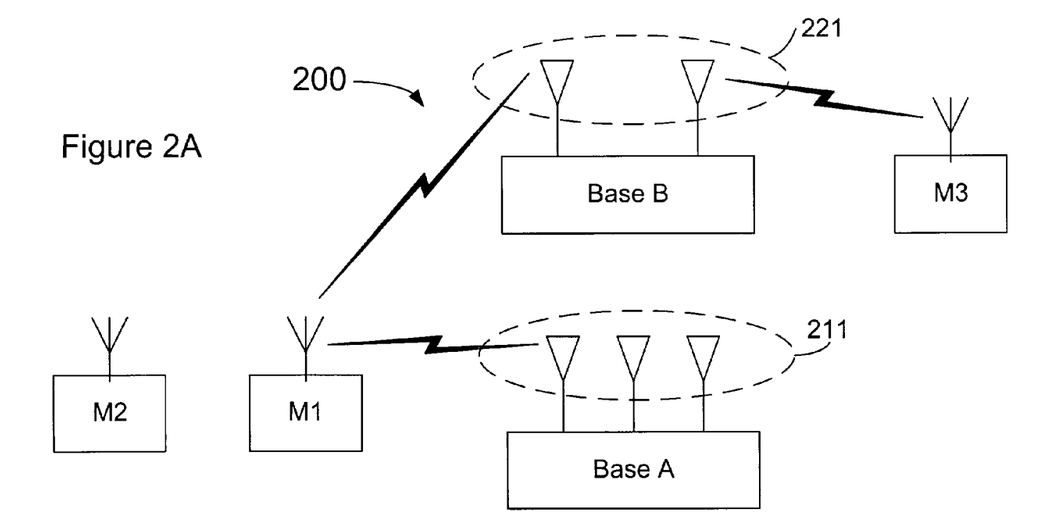
FIG. 2A is a block diagram illustrating exemplary base stations and exemplary mobile stations in accordance with exemplary embodiments of the present invention.

An exemplary CDMA/TDMA system 200 is illustrated in FIG. 2A. In accordance with various exemplary embodiments of the present invention, mobile stations M1, M2 and M3 may choose a base station A or a base station B. Either of base station A or B, whichever is determined to have the "best" performance criteria, or "acceptable" performance criteria, may then assign a time slot to the associated mobile station. In accordance with one example, assume that mobile station M1 has been assigned a particular time slot in base station A, and mobile station M3 has been assigned the same time slot in base station B. The signal strength received by mobile station M1 depends on M1's distance from, and shadowing losses from, base station A, while the received interference power associated with M1 is dependent on losses associated with base station B. Mobile station M1 may then compute an achievable symbol rate, assuming a continuous rate set, and given the SNR as determined by the signal strength and losses. Next, mobile station M1 may determine Ma and k by computing the correlation among the array response vectors 141a-141n.

Figure 2B:
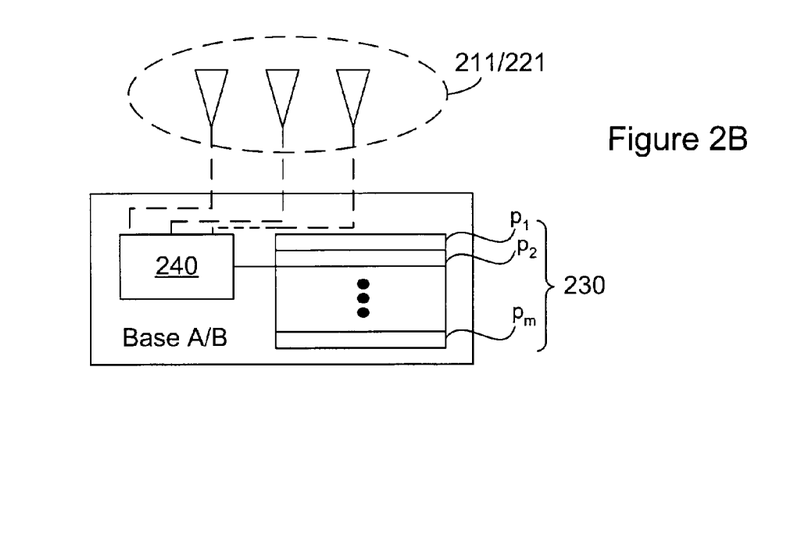
FIG. 2B is a block diagram further illustrating an exemplary base station in accordance with exemplary embodiments of the present invention.

As illustrated in FIG. 2B, it may be necessary to require pilot signals 230 to be continuously or periodically transmitted from all antennas 211 and 221 of base stations A and B respectively, so that any one of mobile stations M1-M3 can calculate parameters. Calculated parameter information (e.g., Ma, k, and G) is then passed back to an appropriate one of base station A or base station B via an uplink control channel, as is known in the art.

In a multi-user scenario, where, for example, mobile station M1 has determined parameter values and a configuration of transmitter antennas is chosen, mobile station M3 may also perform a parameter adaptation that does not appreciably impact mobile station M1's performance, as power is held constant. Accordingly, mobile stations M1 and M3 will achieve different communication data rates.

FIG. 2A illustrates three transmit antennas 211 as the best choice for the environment associated with base station A and mobile station M1, and two antennas are selected for the environment associated with base station B and mobile station M3. Mobile stations M1 and M2 are configured to be in different time slots associated with base station A and thus are unaffected by each other. Further, system 200 may be extended to a case where, rather than holding power constant, power control is implemented. However, such a configuration may pose an additional degree of uncertainty, as interference power may fluctuate after a measurement interval.

TDMA/FDMA System With Re-Use

Figure 3:
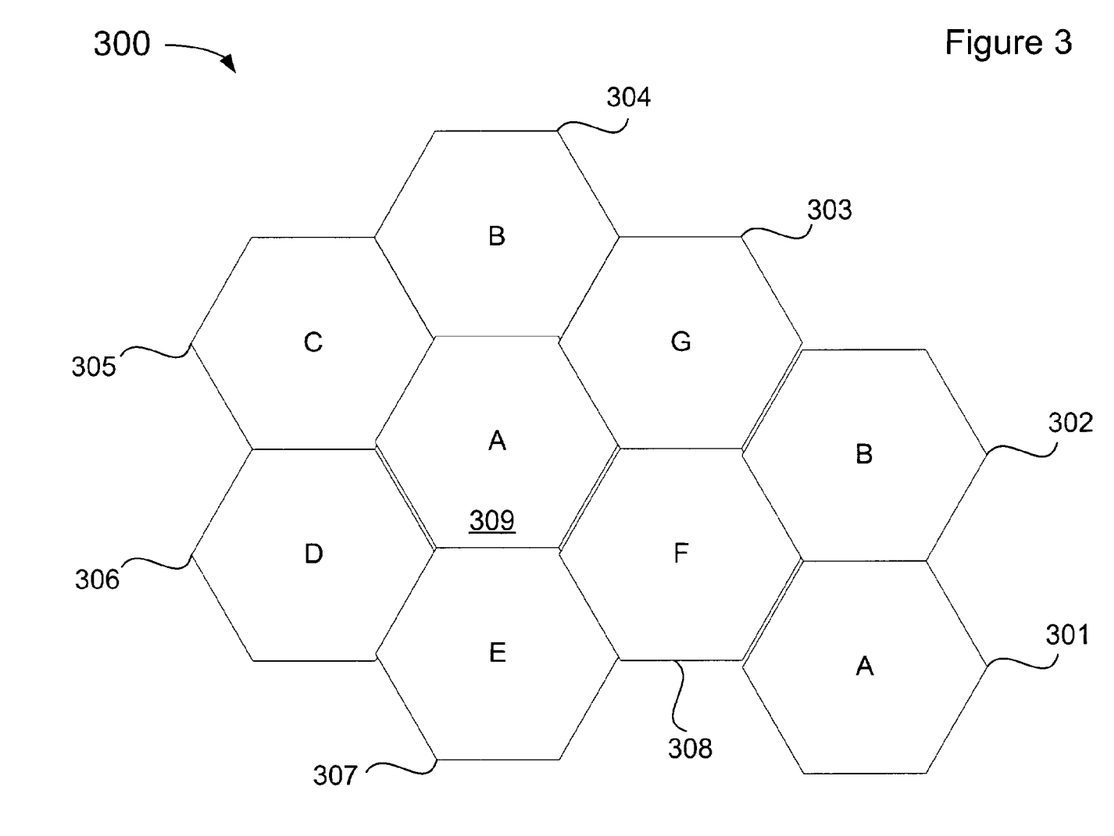
FIG. 3 is a diagram illustrating an exemplary cellular re-use configuration.

In accordance with various alternative exemplary embodiments, a MIMO system in accordance with the present invention may also be adapted for a TDMA/FDMA system with re-use. In a TDMA/FDMA system, users are assigned a unique time slot, and a carrier frequency for the particular cell. Since time slots are unique, there is no intra-cell interference, and inter-cell interference is controlled based on a frequency re-use pattern, as commonly known in the art. A frequency re-use pattern is shown in FIG. 3, wherein a set of seven (7) frequencies A-G are applied as in a symmetric pattern for cells 301-309 of a geographic area. The group of cells 301-309 may be referred to as a cluster, e.g., cluster 300. Interference within cluster 310 may be reduced by introducing geographic distance between those of cells 301-309 that are operating on the same frequency. For example, within cluster 300, the nearest interfering cell is two cell diameters away, e.g., "rival" cells 301 (frequency A) and 309 (frequency A). The same basic concept may be applied to sectorized systems, e.g., those systems where different frequencies are used within cell sectors. These sectorized systems, similar to those systems utilizing re-use patterns, are well-known in the wireless communication art.

In accordance with a preferred embodiment of the invention, an exemplary system operates at full power for all users within a continuous rate set, enabling different data rates to be achieved at different receiver locations. As previously described, the achievable symbol rate may be computed from the measured power, interference and transmitting antenna configuration, with a modulation order negotiated accordingly. Alternatively, power control can be applied directly to meet a request for a specific rate or rate set.

Illustrative Adaptation Procedures

An initial assumption is that a mobile station has the capability to measure the following parameters: average received signal power, Ps, average received interference power, I, channel coefficient matrix, H, and correlations matrix R, where $R=H^H H$. As is known, the channel coefficient matrix H is a result of ordinary channel estimation.

Next, it is understood that (QPSK (k=2)) is generally the most efficient modulation in an interference-limited environment (meaning that it offers the highest system throughput when interference is linearly proportional to the signal power). Therefore, k=2 is set as the system "default" modulation order.

The symbol rate is determined from the signal power and noise power. An assumption is made that there is a fixed frame error rate (FER) that the system is required to achieve. The FER corresponds to a coded bit error rate (BER), which corresponds to a signal energy to noise ratio (Eb/No) requirement for a given modulation, a given forward error correction (FEC), and a given diversity. Factors such as vehicle mobility, for example, may also have an impact on the FER. A default FER value may be assumed, or alternatively the receiver may have some means of measuring the fading rate. Accordingly, a fixed FEC scheme is assumed, and it is also assumed that the diversity order is known at the receiver. Hence, the receiver knows the target Eb/No via a table look-up, for example, or other equivalent scheme.

Thus for a CDMA/TDMA case:

$$\left.\frac{E_b}{N_o}\right|_{req} = \frac{P_s G}{I} \qquad (1)$$

Equation (1) may be solved for a spreading factor, G, given that the other quantities are known. It should be noted that G may be defined as the ratio of bit duration and chip duration.

For a FDMA/TDMA case, the coded symbol rate, Rcs, can be found from:

$$\left.\frac{E_b}{N_o}\right|_{req} = \frac{P_s r B}{k R_{cs} I} \qquad (2)$$

where r is the code rate, k is the modulation order, and B is the bandwidth. It should be noted that Equation (2) may be initially solved for the rate assuming k=2.

Spreading gain or symbol rate for a given SNR environment may thus be determined effectively setting a minimum throughput. Once spreading gain is determined, the transmitter configuration may be set and modulation order determined. In accordance with various exemplary embodiments of the present invention, several transmitter configuration options are possible: selection of the number of antennas, selection of a specific on/off pattern of antennas, and selection of specific eigenmodes.

Option 1: Selection of the Number of Antennas

In one exemplary procedure, available transmit antennas 111a-m are numbered 1 through M. It is assumed that H denotes the complete M×N channel matrix, and that $H_S$ denotes an M×S matrix corresponding to S number of antennas being selected (S=1 to N). This implies for example that $H_3$ contains the same columns as $H_2$, plus an additional column. Accordingly, Equation (3) is computed as follows:

$$s = \arg\max_{s=1,M} \log_2 \det\left(I + \frac{\rho}{s} H_s H_s^H\right) \quad (3)$$

In Equation (3), the value of S (number of transmit antennas) is selected so as to optimize the link capacity, given the current channel matrix, and $\rho = P_S G/I$ Option 2: Selection of a Specific on/off Pattern of Antennas In this procedure, it is assumed that the transmitter is configured by selecting which specific antennas should be active. It should be noted that the selection of a specific on/off antenna pattern may be accomplished with relatively less feedback information than, for example, configuring the transmitter by selecting specific eigenmodes, which is explained further below. Thus to configure a transmitter array, let $\alpha \in \{[0.1]M\}$ denote a vector that indicates which of the physically existing M antennas to activate, where binary 1 denotes "on", and binary 0 denotes "off".

Assuming availability of the complete channel coefficient matrix, or H matrix at the receiver, a search-over transmit configuration may be adopted using the following equation:

$$\max_a \log_2 \det\left(I + \frac{\rho}{n_{ta}} H_a H_a^H\right) \quad \forall\, a \in \{0, 1\}^M, a \neq \{0\}^M, \quad (4)$$

where $H_\alpha$ denotes the column-punctured channel matrix of dimension M×$n_{t\alpha}$, where $n_{t\alpha}$ represents the number of transmitters active, $R=H^H H$ (correlation matrix) and is the carrier to interference ratio (i.e., signal-to-noise ratio or SNR). The value of $n_{t\alpha}$ may further be defined as:

$$n_{t\alpha} = \alpha^T \alpha \quad (5)$$

It should be noted that performing a search-over transmit configuration in accordance with Equation (5) requires a search through $2^M - 1$ possibilities. In equation (5), superscript T means "transpose", the tangible result being the choice of the vector $\alpha$, which indicates the antennas that should be turned on.

An ad hoc approach to determining $\alpha$, the vector that indicates which of the physically existing M antennas to activate, is also possible. As an example, a receiver preferably arranges the order of M substreams by power, e.g., the diagonal of $\rho$. The first substream is automatically accepted. Remaining substreams are evaluated one at a time in power order. The j-th substream is accepted if:

$$\frac{|h_i^H h_j|}{\|h_i\| \sigma^2} < \tau \quad (6)$$

for all i that are already accepted, where $h_i$ is the i-th column of H and $\rho$ is the SNR. It can thus be appreciated that a vector may be useful only if it is sufficiently distant from all the other accepted vectors relative to noise power. It should be noted that $\tau$ is a known threshold.

If $n_{t\alpha}=M$, there may be sufficient SNR to increase the modulation order. Accordingly, the entire adaptation process may be repeated with the next highest order (e.g., k=4) to determine whether a higher throughput can be achieved. Using a low rate control channel, a receiver may communicate back to the transmitter parameters G or Rcs, Ma, and k for further refining transmit parameters.

Option 3: Eigenmode Transmission

A further procedure assumes that the complete channel matrix is available at the transmitter 110. The channel matrix is decomposed using the singular value decomposition to get $H=U\Lambda V^H$. The matrix U provides a set of M eigenvectors to be used at the transmitter 110. All M transmit antennas 111a-m are used; however, not all M substreams may be used. With a finite transmit power available, transmit power $P_T$ is allocated to the eigenmode substreams by a water-pouring algorithm identified as follows:

$$\tilde{\lambda}_i = \left(\upsilon - \frac{1}{\lambda_i}\right)^+, \sum_{i=1,M} \left(\upsilon - \frac{1}{\lambda_i}\right)^+ = P_T \quad (6)$$

Thus, in Equation (6) each $\lambda_i$ indicates the power to be used on any particular eigenmode in the matrix $(V^H)_i$, $\upsilon$ representing the set of M eigenvectors to be used at the transmitter, is determined from the second part of equation (6), and $\Lambda=\text{diag}(\lambda_1, \ldots, \lambda_M)$.

The invention being thus described, it will be obvious that minor variations may exist which do not depart from the intended scope of the invention. For example, though adaptation is described hereinabove with reference to FER, it is also possible to perform adaptation in a similar manner with reference to, for example, a FEC coding scheme. Additionally, the above-described method and system has been described as comprised of several components, flowcharts or blocks, it should be understood that the method and system can be implemented in application specific integrated circuits, software-driven processor circuitry, or other arrangements of discrete components. Accordingly such minor deviations, variations, and modifications are intended to fall within the scope of the following claims.

What is claimed is:

1. A method for increasing data throughput in a communication system employing multiple antennas, comprising:

demultiplexing an input data stream into M substreams, each of the M substreams having a data rate lower than a data rate of the input data stream;

transmitting signals representing said M substreams from a transmit array of M antennas to at least one receiver based on at least one of a number of the M antennas to employ and on/off patterns that are specified for the M antennas; and adjusting at least one parameter based on feedback information including at least one of an integer representing the number of the M antennas to employ for the transmitting and a vector including a pattern of ones and zeros representing the on/off patterns that are specified for the M antennas used for the transmitting, wherein the number of M antennas is represented by a parameter s that is defined by the equation:

$$s = \arg\max_{s=1,M} \log_2 \det\left(I + \frac{\rho}{s} H_s H_s^H\right),$$

wherein I represents an identity matrix, $H_s$ is a channel coefficient matrix with s columns, and $\rho$ is a channel signal-to-noise ratio.

2. The method of claim 1, wherein at least one condition detected at a receiver is used to generate the feedback information, the at least one condition includes radio characteristics measured at the receiver to determine at least one of a transmitter configuration, a modulation order, and a spreading gain that is subject to a desired error rate.

3. The method of claim 1, wherein said step of transmitting includes mapping each substream of said M substreams to a corresponding antenna in the transmit array.

4. A method for increasing data throughput in a communication system employing multiple antennas, comprising:
   demultiplexing an input data stream into M substreams, each of the M substreams having a data rate lower than a data rate of the input data stream;
   transmitting signals representing said M substreams from a transmit array of M antennas to at least one receiver based on at least one of a number of the M antennas to employ and on/off patterns that are specified for the M antennas; and
   adjusting at least one parameter based on feedback information including at least one of an integer representing the number of the M antennas to employ for the transmitting and a vector including a pattern of ones and zeros representing the on/off patterns that are specified for the M antennas used for the transmitting,
   wherein the on/off patterns are determined by the equation:

$$\max_a \log_2 \det\left(I + \frac{\rho}{n_{ta}} H_a H_a^H\right), \quad \forall a \in \{0,1\}^M, a \neq \{0\}^M,$$

wherein $\alpha$ denotes a vector indicating which of the physically existing M antennas to activate, where binary 1 denotes "on", and binary 0 denotes "off", $H_\alpha$ denotes a column-punctured channel matrix of dimension $M \times n_{ta}$, $\rho$ is a channel signal-to-noise ratio, and $n_{ta}$ is further defined by:

$$n_{ta} = \alpha^T \alpha.$$

5. The method of claim 4, wherein at least one condition detected at a receiver is used to generate the feedback information, the at least one condition includes radio characteristics measured at the receiver to determine at least one of a transmitter configuration, a modulation order, and a spreading gain that is subject to a desired error rate.

6. The method of claim 4, wherein said step of transmitting includes mapping each substream of said M substreams to a corresponding antenna in the transmit array.

7. A method for increasing data throughput in a communication system employing multiple antennas, comprising:
   demultiplexing an input data stream into M substreams, each of the M substreams having a data rate lower than a data rate of the input data stream;
   transmitting signals representing said M substreams from a transmit array of M antennas to at least one receiver based on at least one of a number of the M antennas to employ and on/off patterns that are specified for the M antennas; and
   adjusting at least one parameter based on feedback information including at least one of an integer representing the number of the M antennas to employ for the transmitting and a vector including a pattern of ones and zeros representing the on/off patterns that are specified for the M antennas used for the transmitting;
   receiving said signals at a receive array of N antennas connected to said at least one receiver; and
   processing said signals so as to effect separation of said M substreams into individual substreams, wherein said step of processing further includes:
   (a) detecting one substream while nulling remaining substreams,
   (b) subtracting the detected substream from array elements, and
   (c) determining which substream should be detected next,
   wherein steps (a) to (c) are repeated until all of received signals representing M substreams have been separated into individual substreams.

8. An apparatus employing multiple antennas for increasing data throughput in a communication system, comprising:
   a demultiplexer for demultiplexing an input data stream into M substreams, each of the M substreams having a data rate lower than a data rate of the input data stream; and
   a transmitter for transmitting signals representing said M substreams from a transmit array of M antennas to at least one receiver based on at least one of a number of the M antennas to employ and on/off patterns that are specified for the M antennas, the apparatus adjusting at least one parameter based on feedback information including at least one of an integer representing the number of the M antennas to employ for transmitting signals and a vector including a pattern of ones and zeros representing the on/off patterns that are specified for the M antennas used for transmitting,
   wherein the number of M antennas is represented by a parameter s that is defined by the equation:

$$s = \arg\max_{s=1,M} \log_2 \det\left(I + \frac{\rho}{s} H_s H_s^H\right),$$

wherein I represents an identity matrix, $H_s$ is a channel coefficient matrix with s columns, and $\rho$ is a channel signal-to-noise ratio.

9. The apparatus of claim 8, wherein at least one condition detected at a receiver is used to provide the feedback information, the at least one condition includes radio characteristics measured at the receiver to determine at least one of a transmitter configuration, a modulation order, and a spreading gain that is subject to a desired error rate.

10. The apparatus of claim 8, wherein said transmitter maps each substream of said M substreams to a corresponding antenna in the transmit array.

11. An apparatus employing multiple antennas for increasing data throughput in a communication system, comprising:
   means for demultiplexing an input data stream into M substreams, each of the M substreams having a data rate lower than a data rate of the input data stream;
   means for transmitting signals representing said M substreams from a transmit array of M antennas to at least one receiver based on at least one of a number of the M antennas to employ and on/off patterns that are specified for the M antennas; and means for adjusting at least one parameter based on feedback information including at least one of an integer representing the number of the M antennas to employ for transmitting signals and a vector including a pattern of ones and zeros representing the on/off patterns that are specified for the M antennas used for transmitting signal,
wherein the number of M antennas is represented by a parameter s that is defined by the equation:

$$s = \underset{s=1,M}{\arg\max} \log_2 det\left(I + \frac{\rho}{s} H_s H_s^H\right),$$

wherein I represents an identity matrix, $H_s$ is a channel coefficient matrix with s columns, and $\rho$ is a channel signal-to-noise ratio.

12. The apparatus of claim 11, wherein at least one condition detected at a receiver is used to generate the feedback information, the at least one condition includes radio characteristics measured at the receiver to determine at least one of a transmitter configuration, a modulation order, and a spreading gain that is subject to a desired error rate.

13. The apparatus of claim 11, wherein said means for transmitting maps each substream of said M substreams to a corresponding antenna in the transmit array.

14. The apparatus of claim 11, wherein said means for transmitting maps substreams to weighted combinations of several transmit antennas corresponding to different eigenmodes in said transmit array.

15. A method of receiving data in a communication system employing multiple antennas, comprising:
receiving signals representing M substreams from a transmit array of M antennas that are transmitted based on at least one of a number of the M antennas to employ and on/off patterns that are specified for the M antennas;
providing feedback information to effect transmissions of the transmit array, the feedback information including at least one of an integer representing the number of the M antennas to employ for the transmissions and a vector including a pattern of ones and zeros representing the on/off patterns that are specified for the M antennas for the transmissions;
receiving said signals at a receive array of N antennas connected to at least one receiver;
and processing said signals so as to effect separation of said M substreams into individual substreams, wherein
said step of processing further includes:
(a) detecting one substream while nulling remaining substreams,
(b) subtracting the detected substream from array elements, and
(c) determining which substream should be detected next, wherein steps (a) to (c) are repeated until all of received signals representing M substreams have been separated into individual substreams.

16. The method of claim 15, further comprising:
measuring radio characteristics at a receiver to determine at least one of a transmitter configuration, a modulation order, and a spreading gain that is subject to a desired error rate; and
generating the feedback information based on the measuring.

17. An apparatus employing multiple antennas for increasing data throughput in a communication system, comprising:

a demultiplexer for demultiplexing an input data stream into M substreams, each of the M substreams having a data rate lower than a data rate of the input data stream; and
a transmitter for transmitting signals representing said M substreams from a transmit array of M antennas to at least one receiver based on at least one of a number of the M antennas to employ and on/off patterns that are specified for the M antennas, the apparatus adjusting at least one parameter based on feedback information including at least one of an integer representing the number of the M antennas to employ for transmitting signals and a vector including a pattern of ones and zeros representing the on/off patterns that are specified for the M antennas used for transmitting,
wherein the on/off patterns are determined by the equation:

$$\underset{a}{\max} \log_2 det\left(I + \frac{\rho}{nta} H_a H_a^H\right), \forall a \in \{0, 1\}^M, a \neq \{0\}^M,$$

wherein $\alpha$ denotes a vector indicating which of the physically existing M antennas to activate, where binary 1 denotes "on", and binary 0 denotes "off", $H_\alpha$ denotes a column-punctured channel matrix of dimension $M \times n_{ta}$, $\rho$ is a channel signal-to-noise ratio, and $n_{ta}$ is further defined by:

$$n_{ta} = \alpha^T \alpha.$$

18. The apparatus of claim 17, wherein at least one condition detected at a receiver is used to provide the feedback information, the at least one condition includes radio characteristics measured at the receiver to determine at least one of a transmitter configuration, a modulation order, and a spreading gain that is subject to a desired error rate.

19. The apparatus of claim 17, wherein said transmitter maps each substream of said M substreams to a corresponding antenna in the transmit array.

20. An apparatus employing multiple antennas for increasing data throughput in a communication system, comprising:
means for demultiplexing an input data stream into M substreams, each of the M sub streams having a data rate lower than a data rate of the input data stream;
means for transmitting signals representing said M substreams from a transmit array of M antennas to at least one receiver based on at least one of a number of the M antennas to employ and on/off patterns that are specified for the M antennas; and
means for adjusting at least one parameter based on feedback information including at least one of an integer representing the number of the M antennas to employ for transmitting signals and a vector including a pattern of ones and zeros representing the on/off patterns that are specified for the M antennas used for transmitting signals
wherein the on/off patterns are determined by the equation:

$$\underset{a}{\max} \log_2 det\left(I + \frac{\rho}{nta} H_a H_a^H\right), \forall a \in \{0, 1\}^M, a \neq \{0\}^M,$$

wherein $\alpha$ denotes a vector indicating which of the physically existing M antennas to activate, where binary 1 denotes "on", and binary 0 denotes "off", $H_\alpha$ denotes a column-punctured channel matrix of dimension $M \times n_{ta}$, ρ is a channel signal-to-noise ratio, and $n_{r\alpha}$ is further defined by:

$$n_{r\alpha} = \alpha^T \alpha.$$

21. The apparatus of claim 20, wherein at least one condition detected at a receiver is used to generate the feedback information, the at least one condition includes radio characteristics measured at the receiver to determine at least one of a transmitter configuration, a modulation order, and a spreading gain that is subject to a desired error rate.

22. The apparatus of claim 20, wherein said means for transmitting maps each substream of said M substreams to a corresponding antenna in the transmit array.

23. The apparatus of claim 20, wherein said means for transmitting maps substreams to weighted combinations of several transmit antennas corresponding to different eigenmodes in said transmit array.

* * * * *